US 6,637,382 B1

(12) United States Patent
Brehob et al.

(10) Patent No.: US 6,637,382 B1
(45) Date of Patent: Oct. 28, 2003

(54) TURBOCHARGER SYSTEM FOR DIESEL ENGINE

(75) Inventors: Diana D. Brehob, Dearborn, MI (US); Todd Arthur Kappauf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,027

(22) Filed: Sep. 11, 2002

(51) Int. Cl.⁷ .................................................. F02B 47/00
(52) U.S. Cl. ..................................... 123/25 J; 123/25 N
(58) Field of Search .............................. 123/25 R, 25 J, 123/25 N

(56) References Cited

U.S. PATENT DOCUMENTS

| | | | |
|---|---|---|---|
| 4,408,573 A | 10/1983 | Schlueter et al. | |
| 4,502,420 A | 3/1985 | Mezger | |
| 4,558,665 A | 12/1985 | Sandberg et al. | |
| 5,131,229 A | 7/1992 | Kriegler et al. | |
| 5,400,746 A | 3/1995 | Susa et al. | |
| 6,178,749 B1 | 1/2001 | Kolmanovsky et al. | |
| 6,390,063 B1 | 5/2002 | Obata et al. | |
| 6,460,491 B1 * | 10/2002 | Stanglmaier et al. | ...... 123/25 J |

* cited by examiner

Primary Examiner—Noah P. Kamen

(57) ABSTRACT

A turbocharger system for a diesel engine includes an exhaust driven intake air compressor, a sensor for tracking the position of the engine's throttle and for generating a throttle position signal, and a water injection system for furnishing water to the engine's air intake. A controller receives the throttle position signal and operates the water injection system such that the rate of water injection will be increased in the event that the time rate of change of the throttle position signal indicates that the throttle pedal is being depressed at a rate exceeding a predetermined threshold.

19 Claims, 4 Drawing Sheets

TURBOCHARGER SYSTEM FOR DIESEL ENGINE

BACKGROUND OF INVENTION

1. Field of the Invention

The present invention relates to a turbocharger system for a diesel engine having both exhaust gas recirculation (EGR) and water injection.

2. Disclosure Information

Modern diesel engines are equipped with exhaust gas recirculation (EGR) systems for reducing the amount of oxides of nitrogen (NOx) produced during combustion. In an EGR system, exhaust gases are routed to the intake of the engine. The presence of combusted gases in the cylinder inhibits NOx production by reducing the peak combustion temperatures. Heretofore, EGR was employed primarily during high torque operating conditions during which high quantities of fuel are combusted and high in-cylinder temperatures and pressures prevail, thus generating maximum levels of NOx. However, diesel engine designers are finding the use of EGR at low torque conditions, such as idle, enables meeting increasingly stringent emission regulations.

To obtain additional power output from a diesel engine of a given displacement, it is common to equip it with a turbocharger. Normally wasted exhaust enthalpy is recovered as work by an exhaust turbine. The shaft of the turbine is coupled to the shaft of a compressor disposed in the engine intake. The shaft work generated by the exhaust gases via the turbine is used to drive the air compressor to pressurize the intake gases.

Turbochargers frequently suffer from a problem known as turbo lag. That is, at low torque conditions, the flow through the engine, and hence the exhaust system, is low; thus, the rotational speed of the turbocharger is low. When the operator demands increased torque, the turbocharger is unable to speed up as quickly as desired to meet the torque demand. During such a transient, fueling is increased to the engine, which generates more power and higher enthalpy exhaust, thereby spinning up the turbine, which in turn compresses more air into the intake, allowing more fueling. Unfortunately, this process takes time, and as a result, engine torque output cannot be increased instantaneously. This problem has been overcome by system engineering encompassing low inertia turbochargers, turbochargers well matched to the engine, electronic control of fuel delivery, and other measures.

In an engine utilizing EGR at low torque conditions, the turbo lag problem is markedly exacerbated for two reasons: when a demand for an increase in torque is received, the fueling rate cannot be increased nearly as much as with no EGR because there is less fresh air in the combustion chamber. Moreover, depending upon the precise configuration employed, EGR may reduce the exhaust flow to the turbocharger, with the concomitant result that the turbocharger turns at a lower speed than if EGR weren't employed. Consequently, vehicles with turbocharged engines using EGR frequently respond slowly to a demand for increased torque.

In general, it is known that water is an alternative to EGR for controlling NOx. The inventors of the present invention have recognized that if water is used for NOx control at low torque operating conditions, the turbocharger lag problem can be overcome. When using water, no exhaust gases are diverted into EGR; thus, the turbocharger rotates at a speed commensurate with a system not using EGR. Also, the amount of water required to obtain the desired NOx inhibition displaces less air than an amount of exhaust gases for the same NOx inhibition effect.

Diesel engine designers have used water injection in an effort to increase the power from turbocharged diesel engines. Typically, water injection is used during steady state operation to increase power output by cooling the combustion chamber with water. U.S. Pat. No. 4,558,665 discloses such an arrangement. Other engine designers have taught, however, that water injection will decrease the amount of fuel that can be burned, thereby decreasing power output. For example, U.S. Pat. No. 5,400,746 contains such a teaching. The inventors of the present invention propose to reduce so-called turbocharger lag through the use of water injection with a diesel engine during transient operation. Such operation will generally be triggered when the engine's throttle pedal is opened at a rate in excess of a threshold value. Moreover, the present inventors teach that it is advantageous to cease injecting water as soon as the turbo lag is not perceptible, while increasing EGR flow rate, so as to decrease water consumption. In effect, additional oxygen enters the engine's cylinders because the exhaust gases (EGR) which would be used according to prior art, are replaced with water, which occupies much less volume in the cylinder. Furthermore, the water vaporizes in the intake system and the intake temperature is decreased due to the latent enthalpy of vaporization of the water. Thus, the density of the air is increased.

Although a system and method according to the present invention maybe used with a diesel engine not having EGR, greater advantages may be realized with engines having electronic control of EGR flow.

SUMMARY OF INVENTION

A turbocharger system for a diesel engine includes an exhaust driven intake air compressor, a sensor for tracking the position of the engine's throttle pedal and for generating a throttle position signal, and a water injection system for furnishing water to the engine's air intake. An EGR valve furnishes recirculated exhaust gas to the engine's air intake. Finally, a controller receives the throttle position signal and operates the water injection system and the EGR valve such that the rate of exhaust gas recirculation will be reduced and the rate of water injection increased in the event that the time rate of change of the throttle pedal position signal indicates that the throttle pedal is being depressed at a rate which exceeds a predetermined threshold value.

The added water may be injected into the engine's air intake either upstream or downstream of the intake air turbocharger or other charge compressor. If the water is injected upstream of the turbocharger, the turbocharger output will greatly increase because the density of the air entering the turbocharger will be increased. Consequently, fuel injected into the engine can be increased without incurring an increase in soot or particulate emission. If, on the other hand, water is injected downstream of the turbo, the lag time before observing increased engine output will be minimized. In either event, the amount of fuel being injected into the engine will generally be increased whenever the rate of water injection is increased. This increased fuel charge will correspond with the increased availability of oxygen in the air charge entering the engine's cylinders.

For an engine using both water injection and EGR according to the present invention, the amount of water being injected may be increased without reducing the flow rate, or amount, of EGR in the event that the EGR flow rate is below a predetermined threshold. On the other hand, if EGR flow rate is above a predetermined threshold, EGR rate will preferably be reduced as the amount of water being injected is increased. Water injection will be increased only until the turbocharger reaches an operating point sufficient to support the higher torque output desired by the driver or otherwise indicated by the depressed throttle pedal. In other words, when the turbocharger reaches a sufficiently high output point, injection of water into the engine will be cut off.

According to another aspect of the present invention, a method for controlling a turbocharged diesel engine includes the steps of tracking the position of the engine's throttle pedal and generating a corresponding throttle pedal position signal, and injecting water into the engine's air inlet in the event that the time rate of change of the throttle pedal position signal indicates that the throttle pedal is being opened at a rate exceeding a predetermined threshold. Finally, the amount of fuel being injected to the engine will be increased during the time corresponding to the injection of water. As described above, the injection of water will be increased until the turbocharger reaches an operating point sufficient to produce the torque indicated by the throttle operation and discontinued thereafter. At such time as water injection is decreased, EGR will be correspondingly increased.

It is an advantage of the present invention that a system and method according to the present invention will allow operation of a turbocharged diesel engine with lower or less objectionable turbo lag because the use of water injection during transient operation or tipin will allow increased oxygen to enter the engine's cylinders, thereby allowing increased fueling without excessive exhaust emissions.

Other advantages as well as objects and features of the present invention will become apparent to the reader of this specification.

DETAILED DESCRIPTION

Figure 1:
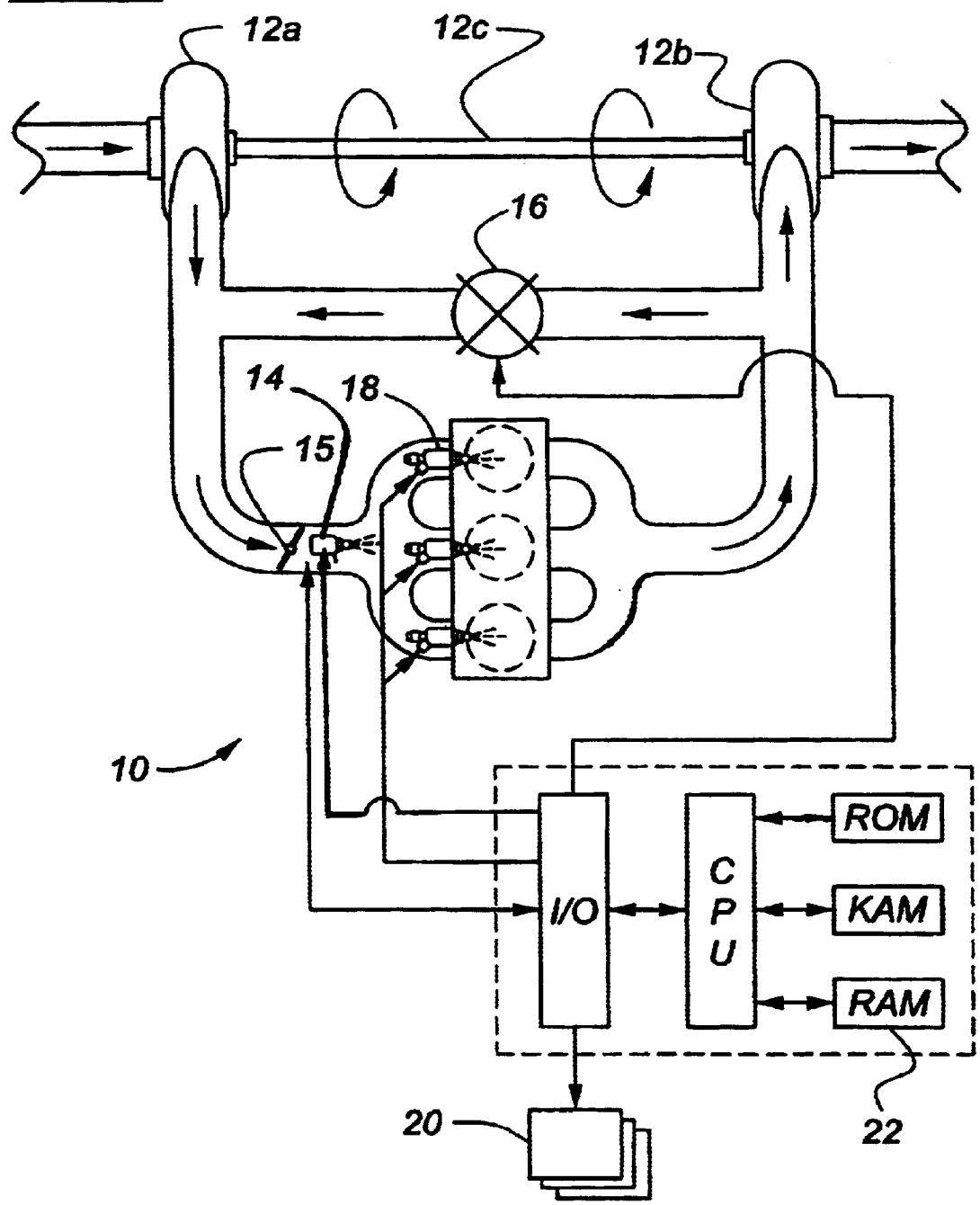
FIG. 1 is a schematic representation of the component parts of a turbocharger system according to the present invention.

As shown in FIG. 1, base engine 10, which may comprise either a diesel engine or another type of internal combustion engine known to those skilled in the art and suggested by this disclosure, receives inlet air from turbocharger 12, which includes compressor section 12A, which is driven by turbine section 12B via common shaft 12C. Turbocharger 12 is supplied with not only air but also EGR via EGR valve 16 and water via H2O injection system 14. EGR valve 16 and H2O injection system 14 are controlled by controller 22 which is drawn from the range of engine controllers known to those skilled in the art and suggested by this disclosure. Controller 22 receives information from a variety of sensors 20, which generally include a throttle pedal position sensor (not shown) which measures the actual angle of the engine's throttle pedal. Controller 22 differentiates angular throttle position, $\alpha$, into a value, $\omega$, corresponding to the time rate change of the throttle position signal. This $\omega$ is used to determine when tip in occurs. This tip in may be viewed in another vein as transient operation of the engine at a load in excess of a predetermined threshold. The $\omega$ value is a convenient framework for determining when tip in has occurred. Conventionally, controller 22 has inter alia, a read-only-memory (ROM), a keep-alive-memory (KAM), a readable-addressable-memory (RAM), and a central processor (CPU).

Those skilled in the art will appreciate in view of this disclosure that the term "throttle" generally refers to a mechanism by which a vehicle's driver communicates his expectations regarding acceleration of the vehicle. And, this is true regardless of whether the engine has an air throttle, which is shown at 15 in FIG. 1. For example, with engines such as certain diesel engines or other types of engines in which fuel is injected directly into the engine's cylinders, the throttle pedal position may control the position of a fuel injection pump rack. Alternatively, the accelerator pedal may control only the position of a potentiometer, with a position signal being provided to an engine controller 22.

Figure 3:
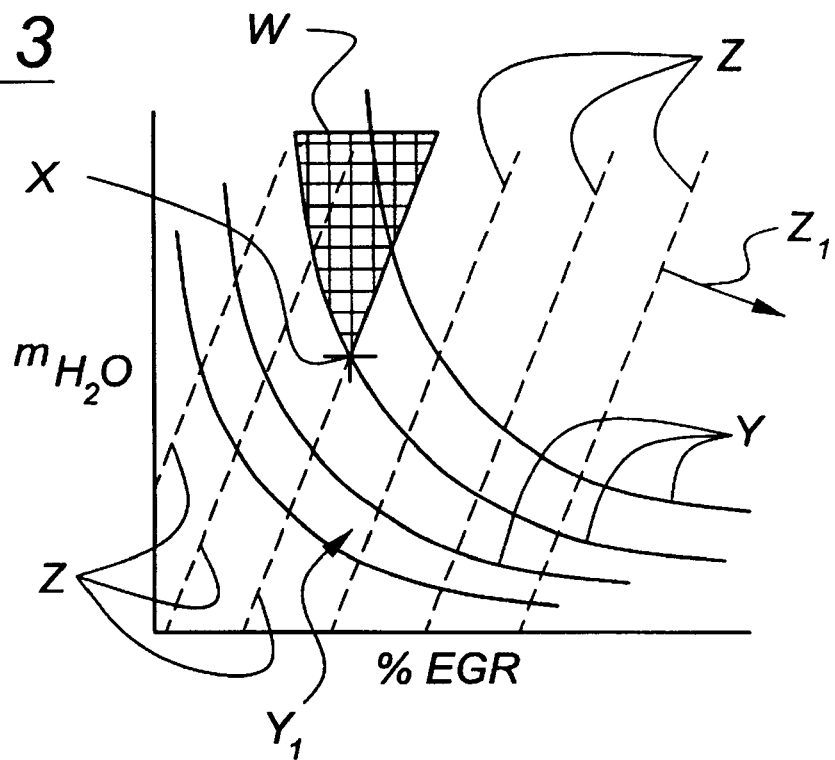
FIG. 3 illustrates a plot of water injection rate, EGR rate, and lines of constant turbo lag and oxides of nitrogen (NOx) for a typical diesel engine.

Turning now to FIG. 3, the abscissa shows the EGR rate, with the ordinate showing water mass injection rate. Lines Z of FIG. 3 are plot lines of constant turbo lag, with arrow $Z_1$ indicating the direction of increasing turbo lag. Similarly, lines Y of FIG. 3 are plot lines of constant NOx, with arrow $Y_1$ indicating the direction of increasing NOx. FIG. 3 shows that as percent EGR increases, so does turbo lag. If on the other hand, it is desired to keep NOx emissions at a constant value, lines Y come into play. Thus, as EGR decreases, water injection must be increased markedly to maintain NOx at a constant value. Region W illustrates a locus in which the mass flow of water and the mass flow of EGR being inducted into the engine produce the ultimate result of controlling both turbo lag and NOx emissions. Point X on FIG. 3 represents an operating point in which water injection rate is at a practical maximum value so as to avoid excessively rapid depletion of the water supply. Thus, it is an objective of a system according to the present invention to move the operating point further on the EGR axis towards the water injection axis, while holding the water injection to a minimum acceptable value. In essence, a system or method according to the present invention permits the EGR which would normally be used for NOx control to be supplanted by water which, because it cools the incoming air charge without reducing exhaust flow to the turbocharger, allows more fuel to be burned, albeit at a lower peak temperature. As a result, turbo lag is reduced at substantially equivalent NOx emissions.

Figure 2:
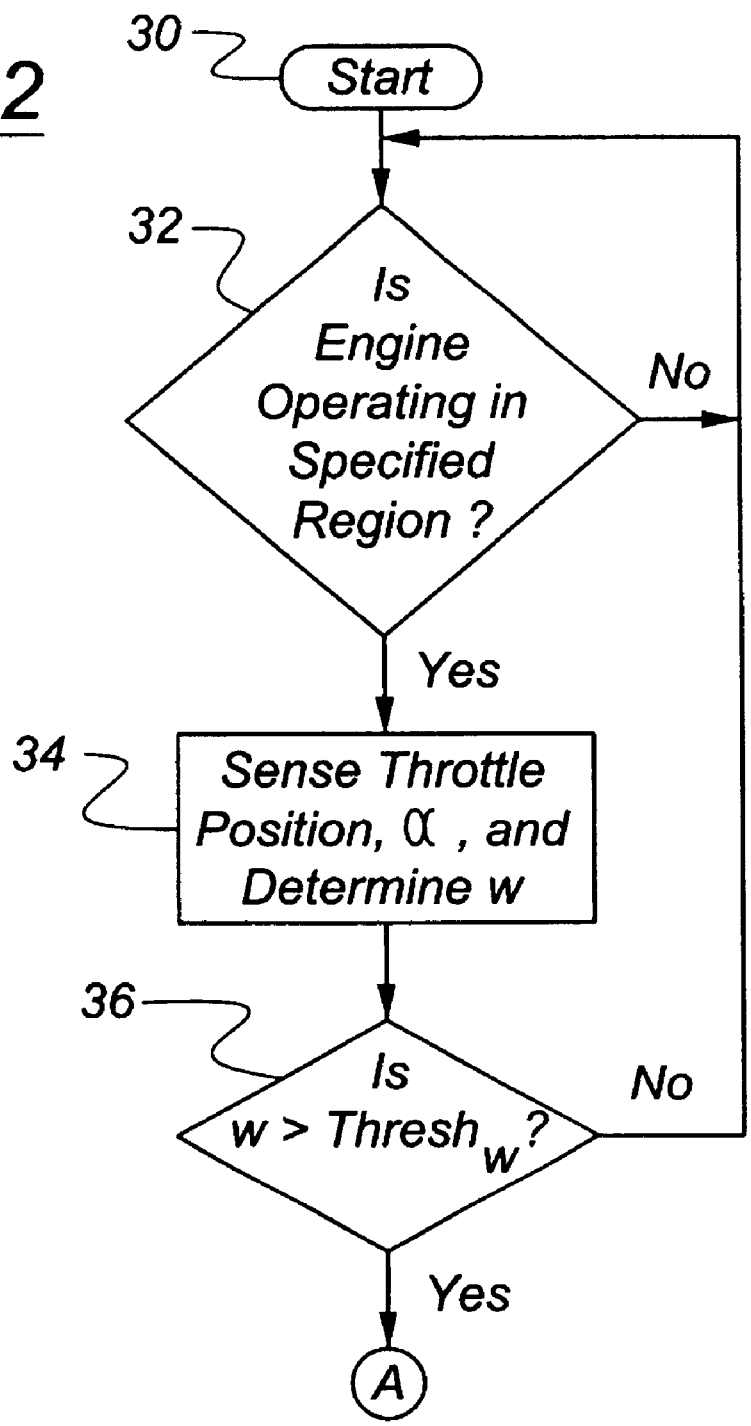
FIG. 2 contains a flowchart of a turbocharger system control method according to the present invention.
Figure 2:
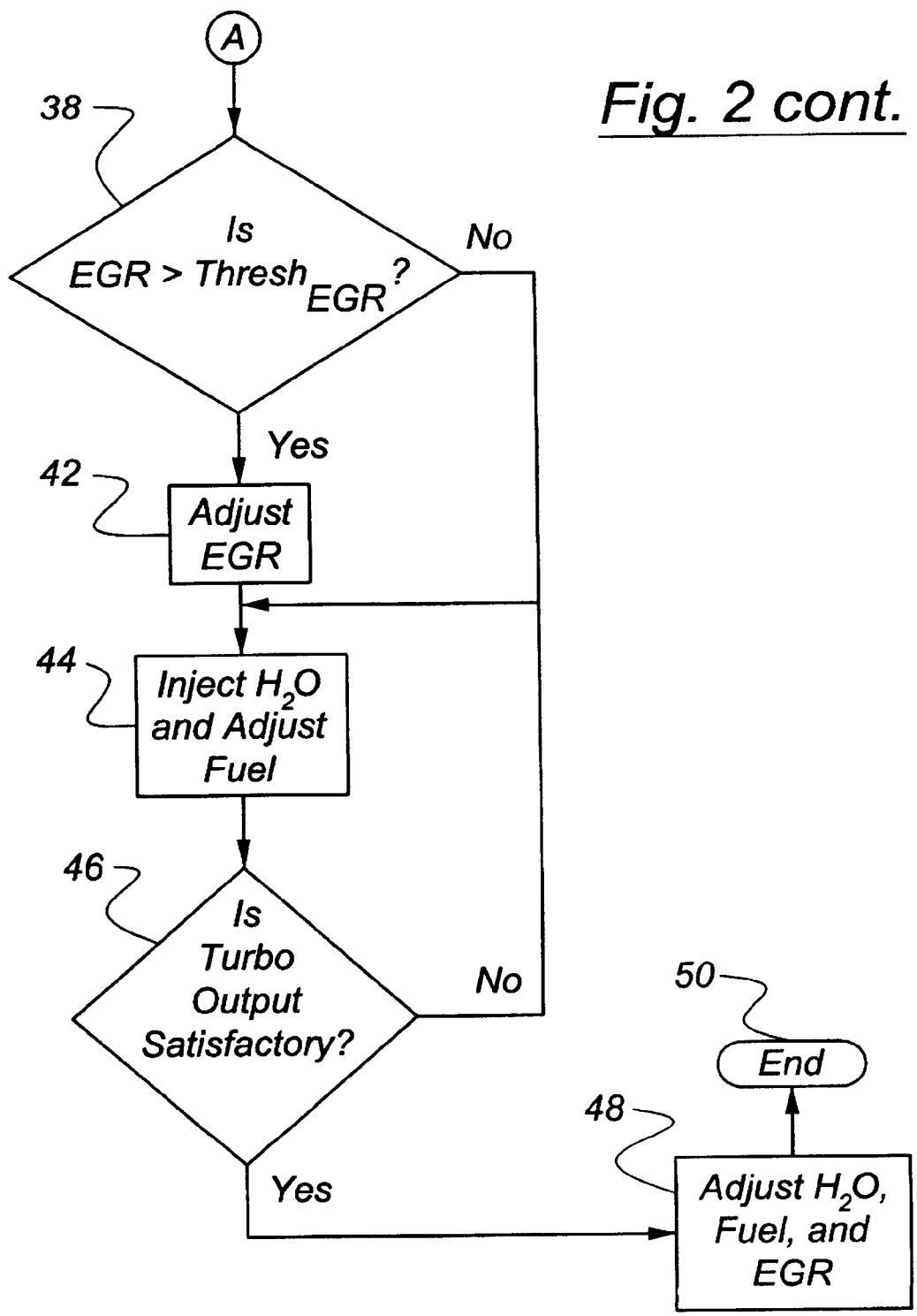

FIG. 2 illustrates a method according to the present invention for handling a turbocharger system of a diesel engine. The routine starts and then moves to block 32 wherein the question is asked whether the engine is operating in a specific region in which water injection is appropriate in the event that the engine's throttle pedal is depressed at a rate exceeding a predetermined threshold. Or, in other words, if a tip-in has occurred, should water injection be used according to the present invention? This region may be characterized by a particular engine temperature or ambient temperature, or by a particular level of EGR flow or turbo boost pressure. For example, if the engine is cold, it will be unnecessary to use EGR for NOx control, and turbo lag may be eliminated by merely providing more fuel to the engine during transient operation, without the need for water injection.

If the answer to question in block 32 is "no", controller 22 loops back to restart the routine. If however, the answer to the question posed in block 32 is "yes", the routine moves to block 34 where throttle position, α, is sensed, and time rate of change of throttle pedal position, ω, is calculated. The routine then moves to block 36, wherein a question is asked regarding the value of ω. If ω is greater than a calibratable threshold value, thresh $_W$, the answer is yes in block 36, and if it is less than the threshold value thresh $_W$, the answer is no at block 36. If the answer is no, the routine moves once again to block 32. If however the answer is yes in block 36, the routine moves to block 38. Moving to block 38 signifies that the operator of the engine, whether human or otherwise, has depressed the throttle pedal at a rate which is sufficiently aggressive to warrant the use of water injection to avoid turbocharger lag. In other words, the operator has tipped in.

At block 38 EGR rate is read. If the EGR rate is less than a calibratable threshold value, thresh $_{EGR}$, the routine moves to block 44, which will be discussed below. If however, if the answer is yes at block 38, the routine moves to block 42 wherein the EGR will be adjusted. This adjustment may include either decreasing the EGR, or shutting it off entirely. Having adjusted the EGR at block 42, the routine moves to block 44 wherein water is injected and fuel is correspondingly adjusted to handle increased oxygen resulting from the injected water.

At block 46 the routine asks whether the turbo output is satisfactory. In the context of this specification, "satisfactory" generally means that the engine, including the turbo is operating within a region in which the torque output approximates the output requested by the throttle pedal operation. This may mean steady state in some cases, or transient operation in others. For example, if a new torque demand is only slightly greater than the previously existing demand the steady state may be reached quickly. If, on the other hand, the new torque demand is much greater than the previous demand, water injection may be cut back as soon as the turbo lag is no longer perceptible.

Figure 4:
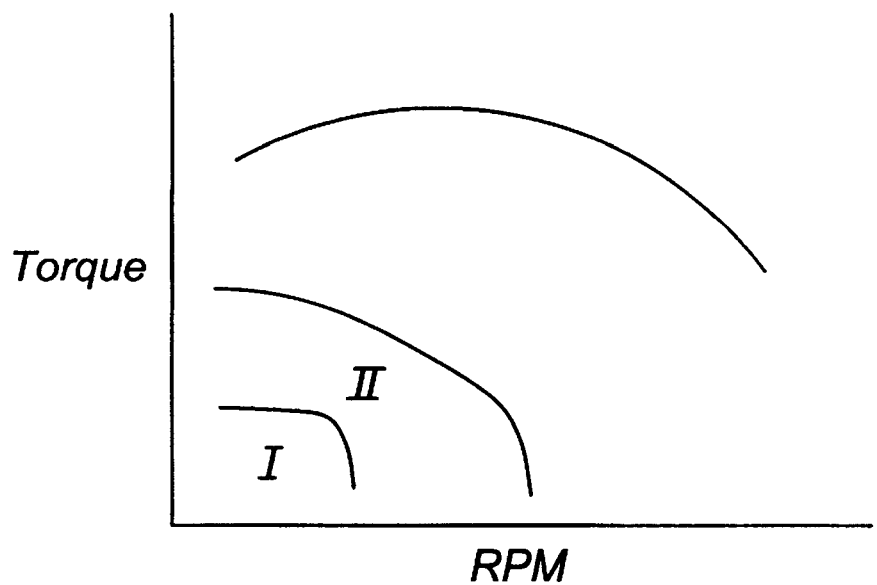
FIG. 4 illustrates a plot of engine speed and load, divided into a plurality of operating regions.

If the answer at block 46 is "no", the routine will return to block 44. If however, if the answer to the question posed at block 46 is yes, the routine moves to block 48 wherein the injected water, fuel flow, and EGR flow are all adjusted. Normally, as noted above, it is expected that the water injection rate will be reduced or eliminated once the turbocharger achieves the output level corresponding to the throttle pedal operation, so as to conserve water. Fuel flow will be similarly reduced. However, to maintain acceptable emissions control performance, EGR will be increased. The routine ends at 50, to start again at block 32 with the determination of whether the engine is operating in a specific region in which water injection is indicated. In essence, the water injection continues until the turbocharger output increases to a point corresponding with the rate at which the throttle pedal is depressed. If desired, the turbocharger output may also be placed in correspondence with the magnitude of the throttle opening. According to another aspect of the present invention, the rate of water injection may further be a function of the speed and load at which the engine is being operated before the tipin event occurs. Two regions of operation are shown in FIG. 4. In region I, characterized by lower speeds and loads, it is expected that the engine may be operated without EGR during tipin, because the use of water injection alone will provide a more speedy recovery of turbo output. On the other hand, if the engine is operating in region II of FIG. 4, EGR may be maintained at a lower level because the engine's torque output is at a higher level prior to tipin.

A system and method according to the present invention maybe employed with an engine not using external EGR. This is true because an engine without EGR may exhibit turbocharger lag treatable via the increased oxygen and fuel regime made possible by the present water injection system and method.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A turbocharger system for a diesel engine, comprising:
    an exhaust driven intake air compressor;
    a sensor for tracking the position of the engine's throttle pedal and for generating a throttle pedal position signal;
    a water injection system for furnishing water to the engine's air intake;
    an EGR system for furnishing recirculated exhaust gas to the engine's air intake; and
    a controller for receiving the throttle pedal position signal and for operating the water injection system and the EGR system such that the rate of exhaust recirculation will be reduced and the rate of water injection increased in the event that the time rate of change of the throttle pedal position signal indicates that the throttle is being opened at a rate which exceeds a predetermined threshold.

2. A turbocharger system according to claim 1, wherein said water is injected to the engine's air intake upstream of the intake air compressor.

3. A turbocharger system according to claim 1, wherein the amount of fuel being injected into the engine is increased when the rate of water injection is increased.

4. A turbocharger system according to claim 1, wherein the amount of water being injected into the engine is increased without reducing the amount of EGR in the event that the EGR flow rate is below a predetermined threshold.

5. A turbocharger system according to claim 1, wherein the amount of water being injected into the engine is increased until the turbocharger output reaches a level corresponding to the rate at which the throttle pedal is depressed.

6. A turbocharger system according to claim 1, wherein the amount of water being injected into the engine is increased until the turbocharger output reaches a level corresponding to both the rate at which the throttle pedal is depressed and the magnitude of the throttle pedal depression.

7. A turbocharger system according to claim 1, wherein the injection of water into the engine is cut off when the turbocharger reaches an operating point at which turbo lag will not be induced by said cessation of water injection.

8. A turbocharger system according to claim 1, wherein the injection of water into the engine is cut off and the amount of EGR is increased when the turbocharger reaches an operating point corresponding to the torque demand indicated by the throttle pedal depression.

9. A method for controlling a turbocharged diesel engine, comprising the steps of:
    tracking the position of the engine's throttle and generating a corresponding throttle pedal position signal;
    injecting water into the engine's air inlet in the event that that time rate of change of the throttle pedal position signal indicates that the throttle is being opened at a rate exceeding a predetermined threshold; and increasing the amount of fuel being injected into the engine when said water is being injected.

10. A method according to claim 9, wherein the injection of water is increased until the turbocharger reaches a steady operating point.

11. A method according to claim 9, wherein the injection of water is discontinued when the turbocharger reaches a steady operating point.

12. A method according to claim 9, wherein the injection of water is discontinued and a flow of recirculated exhaust is increased when the turbocharger reaches a steady operating point.

13. A method according to claim 9, wherein the injection of water is discontinued and a flow of recirculated exhaust is increased when the turbocharger reaches an operating point at which the turbocharger output corresponds to the torque demand indicated by the throttle pedal depression rate.

14. A turbocharger system for a diesel engine, comprising:
an exhaust driven intake air compressor;
a sensor for tracking the position of the engine's throttle pedal and for generating a throttle pedal position signal;
a water injection system for furnishing water to the engine's air intake; and
a controller for receiving the throttle pedal position signal and for operating the water injection system such that the rate of water injection will be increased in the event that the time rate of change of the throttle pedal position signal indicates that the throttle is being depressed at a rate which will cause increased transient loading of the engine in excess of a predetermined threshold.

15. A turbocharger system according to claim 14, wherein the amount of water being injected into the engine is increased only until the turbocharger reaches a steady state operating point.

16. A turbocharger system according to claim 14, wherein the injection of water into the engine is cut off when the turbocharger reaches a steady state operating point.

17. A turbocharger system according to claim 14, further comprising an EGR system for furnishing recirculated exhaust gas to the engine's air intake, with the controller reducing the amount of EGR entering the engine when said water is injected.

18. A turbocharger system according to claim 14, wherein the rate of water injection is further a function of the speed and load at which the engine was operating at the time the throttle was opened at a rate in excess of said predetermined threshold.

19. A turbocharger system according to claim 14, wherein the rate of water injection is further a function of the speed and load at which the engine is operating.

* * * * *